United States Patent [19]

May

[11] Patent Number: 4,789,836
[45] Date of Patent: Dec. 6, 1988

[54] CIRCUIT FOR USE WITH A LIGHT PEN TO REDUCE JITTER

[76] Inventor: George A. May, R.R. 1, East Sooke Road, Sooke, British Columbia, Canada, V0S 1N0

[21] Appl. No.: 537,954

[22] Filed: Nov. 18, 1983

Related U.S. Application Data

[62] Division of Ser. No. 346,368, Feb. 5, 1982, Pat. No. 4,454,417.

[51] Int. Cl.$^4$ .................. H03K 5/153; G01R 19/165; G01R 29/027
[52] U.S. Cl. .................... 328/117; 307/358; 307/360; 307/517; 328/132
[58] Field of Search ............ 307/234, 358, 360, 517, 307/518; 328/114, 117, 132, 147

[56] References Cited

U.S. PATENT DOCUMENTS

| | | | |
|---|---|---|---|
| 3,289,157 | 11/1966 | Brokaw | 328/117 |
| 4,318,047 | 3/1982 | Dawson | 307/234 |

FOREIGN PATENT DOCUMENTS 1206479 12/1965 Fed. Rep. of Germany ...... 328/117

Primary Examiner—John Zazworsky
Attorney, Agent, or Firm—Majestic, Gallagher, Parsons & Siebert

[57] ABSTRACT

A high resolution light pen comprises a collimation tube slidably mounted within a housing. The collimation tube includes an axially extending channel having a non-reflective surface. A photodetector is fixably mounted within the housing aligned with the channel. A lens is mounted adjacent to the front end of the channel and has a focal length equal to the spacing between the lens and an aligned pixel of the video screen. By this arrangement, all light rays emanating from an aligned pixel and passing through the lens are refracted axially along the channel and directed to the photodetector thereby maximizing the input thereto. The light pen further includes a discrimination circuit which generates computer interrupt signals for reading an address counter. The discrimination circuit generates an interrupt signal when the signal from the photodetector is valid. The interrupt signal is generated at a time which is substantialy independent of the slope of the signals thereby reducing the effects of jitter.

9 Claims, 2 Drawing Sheets

CIRCUIT FOR USE WITH A LIGHT PEN TO REDUCE JITTER

RELATED APPLICATION.

This application is a divisional application of Ser. No. 346,368 filed Feb. 5, 1982 by George A. May, entitled "High Resolution Light Pad For Use With Graphic Displays", now U.S. Pat. No. 4,454,417 issued on June 12, 1984.

BACKGROUND OF THE INVENTION

The subject invention relates to a new and improved light pen for use with graphic displays. More particularly, a light pen is disclosed having a new and improved optical design for use in conjunction with unique electrical circuitry, which provides high resolution and substantially reduces the effects of jitter.

In the prior art, light pens have been used as a pointer device in association with computer controlled, cathoderay tube video displays. It is an object about the size and shape of a fountain pen and includes a means for sensing light and a means for converting this light into an electrical pulse. The pen is held in the hand and pointed at some portion of a picture, symbol or the like being displayed on the screen of the cathode-ray tube. When the electron beam which is tracing the image causes a portion of the screen next to the point of the pen to light up, the pen senses this light and generates an electrical pulse which serves as a computer interrupt signal. Typically, the computer circuitry responds to the interrupt signal by reading an address counter having data which tracks the position of the cathode ray at that particular moment. The address in the counter corresponds to the location of the light pen.

As discussed above, when the photodetector of the light pen is actuated, it generates an interrupt signal which typically causes the computer to read a counter having an address corresponding to the location of the cathode ray. Theoretically, if the interrupt signal were generated simultaneously upon the excitation of the phosphor of the pixel, the location of the light pen could be accurately determined. However, in practice, this result has been difficult to achieve. More particularly, the light rays from an excited pixel that are received by the light pen cause a pulse to be generated having an amplitude which varies according to the intensity of the light received. For example, if the light pen is positioned directly over the desired pixel, the intensity will be maximized and the amplitude of the pulse which is generated by the photodetector will be fairly high. In contrast, if the light pen is not directly aligned with a pixel, the intensity of the light rays received will be reduced such that a pulse having a relatively smaller amplitude will be generated.

While the amplitude of a pulse varies with intensity, the "rise time" of all pulses is constant. Rise time is defined as the length of time it takes for the amplitude of a pulse to rise from 10 per cent of maximum to 90 per cent. The rise time of a system is governed by factors such as the tracking speed of the video beam and the type of phosphor used. The problems of detection occur because pulses having the same rise time but different amplitudes will have different slopes. For example, since a large amplitude pulse will reach a maximum value in the same time period as a smaller pulse, the slope of the larger pulse must be greater. Measurement uncertainties arise because pulses having different slopes will exceed detection threshold limits at different times.

Light pens are generally provided with discrimination circuitry to determine if a pulse generated by a photodetector validly represents an excited pixel. Typically, each pulse is compared to a threshold voltage level to determine if the pulse is valid. In order to generate accurate position data, the time between the start of a pulse and the point at which it crosses the threshold level must be constant for all pulses. However, as mentioned above, the time it takes an incoming pulse to exceed the threshold level will vary with the amplitude, which is in turn dependent upon the intensity of the light received by the photodetector. Accordingly, for an aligned pixel, where the amplitude of the pulse is large and the slope is great, the interrupt signal will be generated fairly quickly. However, if the light pen is not directly aligned with the pixel, a pulse having a smaller amplitude and a shallower slope is produced such that the interrupt signal will be generated at a later time.

This timing uncertainty is the cause of jitter. More particularly, the interrupt signal generated by the light pen causes a counter to be read having an address corresponding to the position of the light pen. However, the time the interrupt signal is generated is a function not only of the light pen position, but of the intensity of the light rays received. For example, since a non-aligned pixel will produce a slower rising pulse that exceeds the threshold level at a later time, the address counter will advance beyond the point which would occur with an aligned pixel. Thus, a slight displacement of the light pen can cause the computer to generate a substantially different address.

Jitter may occur even if the light pen is held stationary relative to the video screen. More particularly, the scanning position of the cathode ray includes a predictable amount of error such that in one sweep the ray might be directly aligned with the light pen while on the next sweep it might be slightly off alignment. Accordingly, even if the light pen is held stationary, the interrupt signals used to produce the location data will vary depending upon the alignment of the excited pixel.

In many prior art applications, this jitter effect is not a major disadvantage. For example, light pens are frequently used merely to point to an area on the video screen. Accordingly, precise data regarding the position of the light pen is not necessary since a location determination anywhere within the field was sufficient. However, in other applications, there is a need for a more accurate light pen. For example, if the light pen were to be used for real time drawing, the precise location of each light pen hit must be determined in order to define continuous line segments.

One example of the prior art circuitry utilized to provide more accurate location data can be found in U.S. Pat. No. 3,512,037 issued May 12, 1970 to Eckert et al. The Eckert patent discloses a fairly complex two step scanning system wherein a first scan is used to obtain the gross position data. Thereafter, a second scan is used to disclose horizontal and vertical tangent points. As can be appreciated this two step scan system is complex and difficult to use. More importantly, it requires that the cathode-ray tube perform special searching techniques. Therefore, this method could not be used where the cathode-ray tube was operating in a standard fashion. Accordingly, it would be desirable to provide new and improved discrimination circuitry that is capable of providing accurate position data of the light pen.

SUMMARY OF THE INVENTION

It is an object of the subject invention to provide a new and improved discrimination circuit for use with a light pen which reduces the effects of jitter.

It is still a further object of the subject invention to provide new and improved discrimination circuitry for use with a light pen wherein an interrupt signal is generated if the input pulse is valid and exceeds a threshold level, with the time of the interrupt signal being independent of the amplitude of the input pulse.

The subject invention includes new and improved discrimination circuitry for generating interrupt signals independent of the amplitude of the pulses. More specifically, each light pen hit generates a pulse which is amplified and then tested to determine if it exceeds an upper threshold level thereby indicating it is a valid pulse. As discussed above, the time it takes for the pulse to reach the threshold level will vary according to the intensity of the pulse. In order to narrow this uncertainty, the timing of the hit is derived from an early stage of the pulse. Accordingly, each pulse is also compared with a lower threshold level. With pulses having an amplitude exceeding four or more times the lower threshold level, the time it takes for any pulse to cross the lower threshold is fairly similar. Thus, the effects of jitter can be substantially reduced by basing the timing of the interrupt signal on the front edge crossing of a lower threshold level and accepting the pulse for output if it also exceeds the higher threshold. By subjecting each pulse to two levels of discrimination, the accuracy of the location determination can be substantially increased.

Further objects and advantages of the subject invention will become apparent by referring to the following detailed description in conjunction with the drawings in which:

DETAILED DESCRIPTION OF THE PREFERRED EMBODIMENTS

Figure 1:
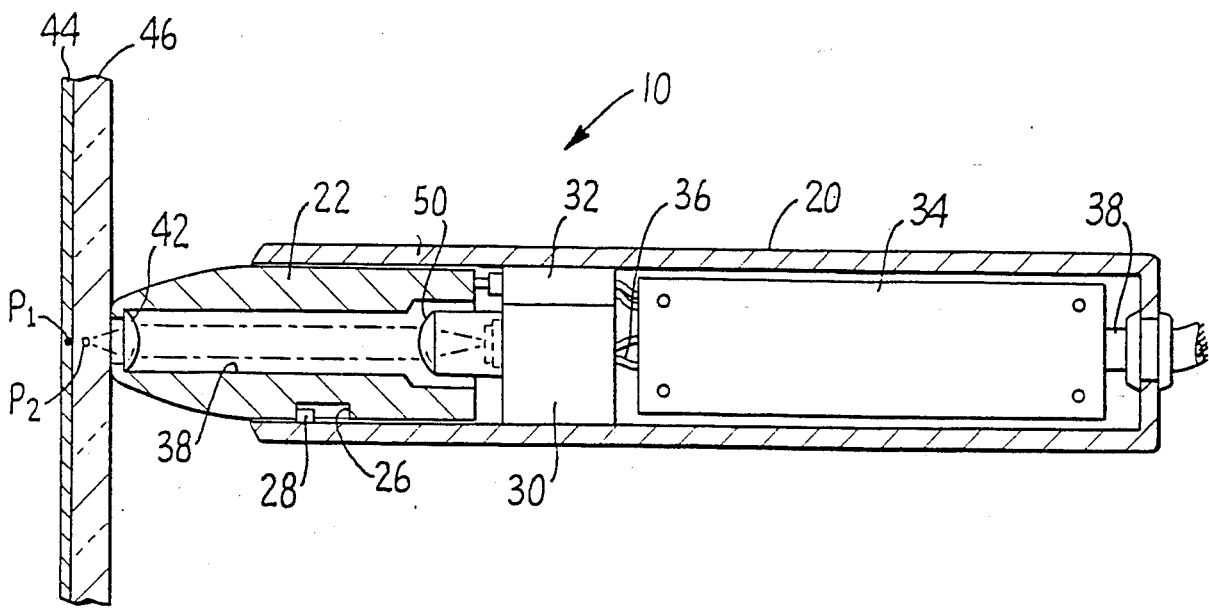
FIG. 1 is a cross-sectional view of the new and improved light pen of the subject invention.
Figure 2:
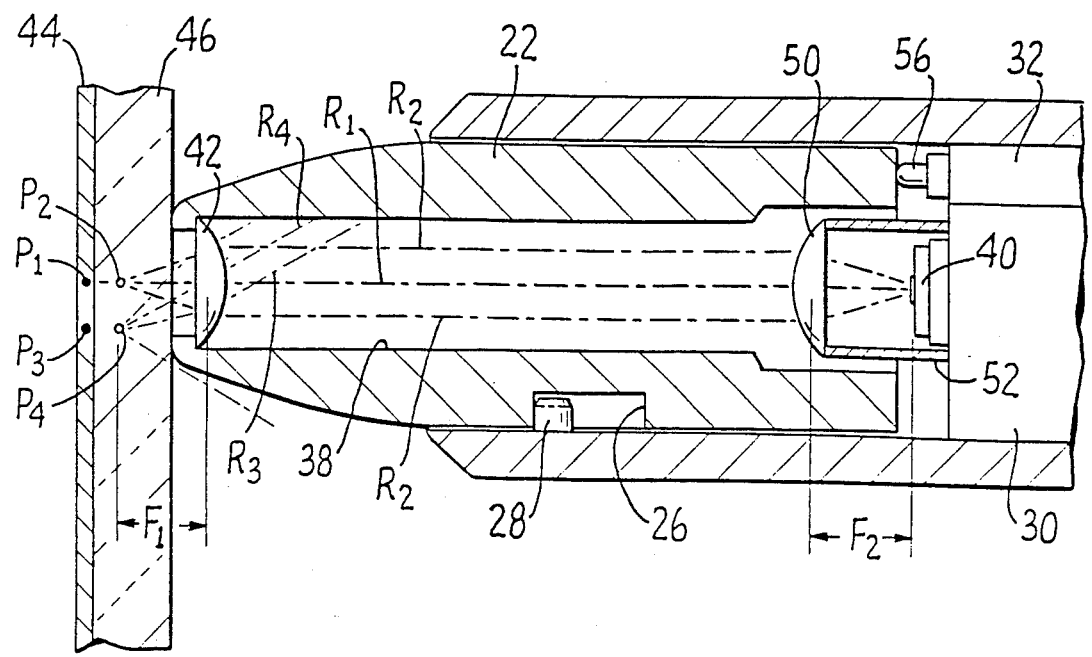
FIG. 2 is an enlarged cross-sectional view illustrating the optics of the new and improved light pen of the subject invention.

Referring to FIGS. 1 and 2, the light pen 10 of the subject invention is illustrated. The light pen 10 includes an elongated cylindrical housing 20 adapted to contain the optical and electrical elements. A cylindrical collimation tube 22 is slidably mounted within the front end of housing 20. Preferably, a recess 26 is provided for receiving a stop pin 28 fixably mounted to the inner surface of the housing 20. The combination of the recess 26 and the stop pin 28 functions to restrict the movement of the collimation tube relative to the housing, with regard to both the length and direction of travel. In the preferred embodiment, the movement of the tube is limited to a direction parallel to the longitudinal axis of the housing.

The light pen 10 includes a photodetector means 30 mounted to the rear of the collimation tube 22. A miniature switch 32 is also disposed adjacent the rear of the collimation tube. The remainder of the light pen housing is adapted to contain circuitry 34 for acting upon the signals received by the photodetector 30. Electrical cables 36 and 38 are provided to connect the circuitry 34 to the photodetector and supporting computer respectively.

The light pen 10 of the subject invention is a high resolution device capable of focusing on an individual pixel of a video screen. This unique result is achieved at relatively low cost due to the new and improved optical construction of the light pen. Referring more particularly to FIG. 2, it will be seen that collimation tube 22 includes a cylindrical channel 38 extending along the longitudinal axis thereof. Preferably, the diameter of the channel 38 is related to the spacing between pixels on the screen and is on the order of 1.5 times the pixel width. The inner surface of the collimation tube is coated with a non-reflective material such that any light rays which intersect with the coating are absorbed rather than reflected. Channel 38 is aligned with sensor 40 of photodetector means 30.

The mechanical and optical characteristics of light pen 10 are described in more detail in the parent application, Ser. No. 346,368 now U.S. Pat. No. 4,454,417 issued June 12, 1984, which is incorporated herein by reference in its entirety.

Figure 3:
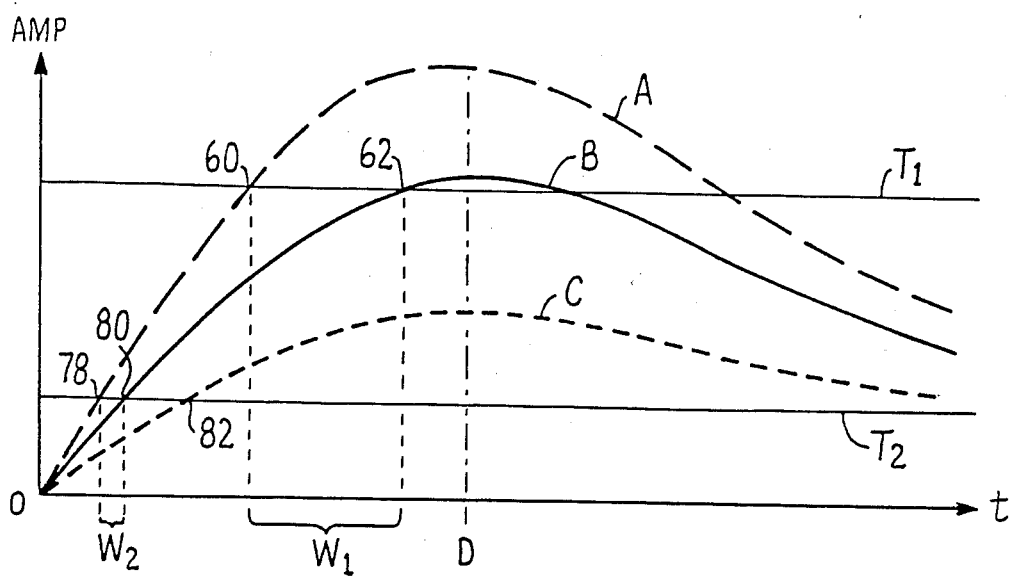
FIG. 3 is a graphical representation of the amplitude of input pulses generated by a light pen.
Figure 4:
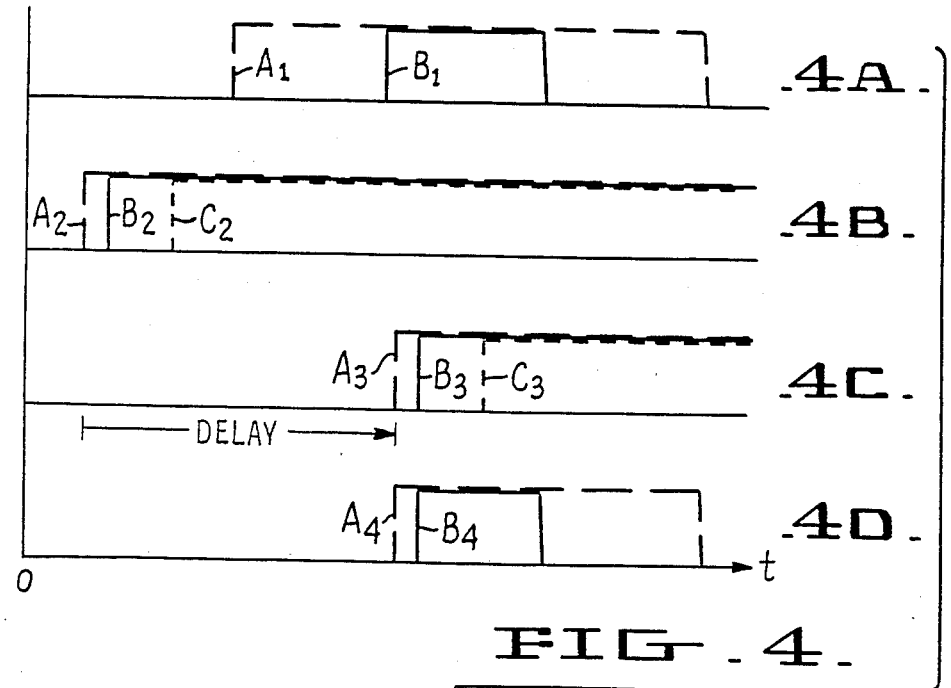
FIG. 4 is a graphical representation of the output pulses produced using the new and improved discrimination circuit of the subject invention.
Figure 5:
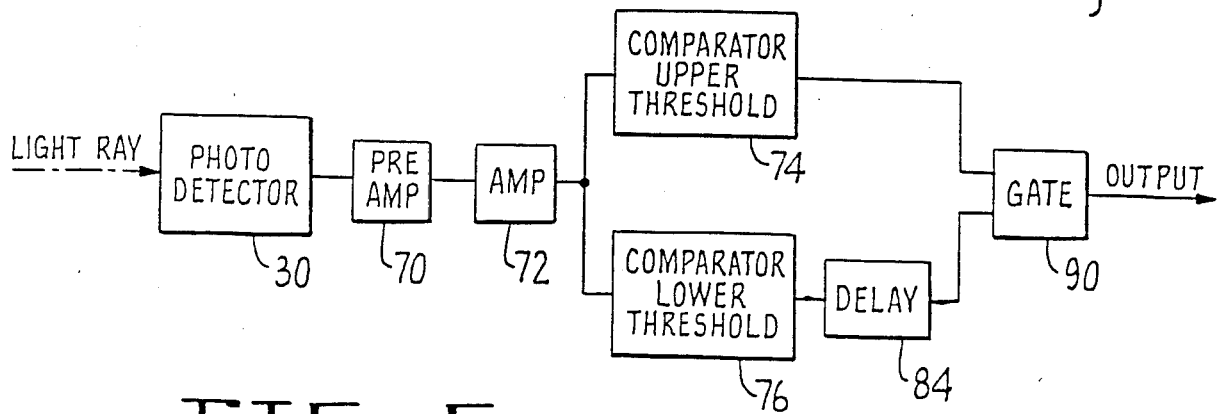
FIG. 5 is a block diagram of the new and improved discrimination circuit of the subject invention.

Referring now to FIGS. 3 through 5, the discrimination circuitry of the subject light pen will described in more detail. Preferably, the circuitry is mounted within the light pen rather than at the computer control to eliminate spurious signals caused by such factors as high frequency noise.

As mentioned above, one of the major shortcomings of the prior art light pen circuitry relates to the effects of jitter. The jitter phenomenon may be more readily understood with reference to FIG. 3, where the horizontal axis represents time, and the vertical axis represents the voltage amplitude of incoming pulses. The curves which are illustrated represent the voltage generated by the photodetector in response to the reception of light rays.

A video screen may be thought of as an array of horizontal lines illuminated by the sweeping motion of the cathode ray. When the light pen is placed on the video screen it will detect light emitted from the phosphor excited by the cathode ray. The cathode ray takes a finite period of time to sweep through the field of the light pen. The tracking speed of the cathode ray, along with the type of phosphor utilized, contributes to the particular rise time of the video system. As noted above, the rise time is defined as the length of time it takes for the amplitude of a pulse to rise from 10 percent of maximum to 90 percent. As illustrated in FIG. 3, each of the pulses labeled A, B, and C reach a maximum point at approximately the same time indicated by line D.

The amplitude of the pulses is governed by the intensity of the light rays received by the light pen. When the light pen is placed on the video screen in direct alignment with one of the lines traced by the cathode ray, a pulse having a maximum amplitude, as illustrated by curve A in FIG. 3, will be produced. In contrast, if the light pen is placed on the video screen in a location displaced slightly from one of the lines traced by the cathode ray, a pulse having a lower amplitude will be generated, as illustrated by curve B in FIG. 3.

Pulses having varying amplitudes will be generated even if the light pen is held stationary with respect to the video screen. More particularly, the tracking of the cathode ray is subject to error such that the degree of alignment with the light pen will vary with each sweep. Accordingly, pulses varying in amplitude will be generated which, in the prior art, resulted in measurement uncertainties. Curve C, illustrated in FIG. 3 is a low amplitude pulse representing a stray signal from a pixel not aligned with the field of the light pen. Discrimination circuitry must be capable of rejecting the latter type of low amplitude pulse as an invalid signal.

Since each of the pulses illustrated in FIG. 3 have different amplitudes, but identical rise times to maximum, their slopes must be different. For example, pulse A, having a maximum amplitude, has a relatively steep initial slope. In contrast, curve B, having a lower amplitude has a relatively shallower slope. As pointed out above, measurement uncertainties arise because pulses having different slopes will exceed detection threshold limits at different times.

Typically, in the prior art discrimination circuitry, the amplitude of a pulse is compared to an arbitrarily set threshold level depicted as $T_1$ in FIG. 3, to determine if the pulse is a valid signal. More specifically, unless the pulse exceeds the threshold level $T_1$, it is assumed that the pulse is merely a spurious signal generated, for example by a pixel near to, but not aligned with the light pen. As seen in FIG. 3, pulse A, having a relatively steep slope, exceeds threshold level $T_1$ at point 60. Pulse B, having a relatively shallower slope, does not exceed threshold level $T_1$ until point 62. Pulse C, representing an invalid signal never exceeds threshold level $T_1$.

In the prior art, when a pulse exceeds threshold level $T_1$, an interrupt signal is generated causing an address in a counter to be read which represents the location of the cathode ray at that time. By this arrangement, the position of the light pen is determined. As illustrated in FIG. 3 however, while pulses A and B began at the same point of origin 0, they exceed threshold level $T_1$ at different times. More particularly, pulse B exceeds threshold $T_2$ a time period $W_1$ after pulse A. Accordingly, the address counter in the computer, tracking the movement of the cathode ray will be permitted to advance such that the circuitry is supplied with an incorrect light pen position. This timing discrepancy is the cause of jitter.

As can be appreciated, a finite time period will elapse between the origin 0 of pulse A and the point 60 at which the pulse crosses threshold level $T_1$. Further, since electronic communications are not truly instantaneous, a finite time period will elapse between time the curve crosses threshold $T_1$ and the address counter is actually read. Accordingly, the address in the counter does not actually correspond to the position of the light pen. Rather, when the counter is read, the address therein exceeds the actual position of the light pen by a fixed amount. This known time difference can be compensated for by logically subtracting a fixed number from the address counter to obtain the actual light pen position. However, the timing uncertainty caused by variations in amplitude is not constant and cannot be corrected, and results in jitter.

In the prior art, the random timing error, illustrated as $W_1$ in FIG. 3, is generally a minimum of 100 nanoseconds which corresponds to an approximately 1.5 pixel error. In contrast, the subject invention provides new and improved circuitry wherein the jitter effects can be reduced to between 20 and 40 nanoseconds corresponding to a 0.5 pixel spacing that effectively permits discrimination of exact pixels.

In accordance with the subject invention, each incoming pulse is tested against an upper threshold level $T_1$ to determine if that pulse is valid. Further, each pulse is also tested against a substantially lower threshold $T_2$ to provide more accurate information regarding the timing of the pulses. The subject circuitry takes advantage of the fact, as seen in FIG. 3, that the paths of pulses of varying intensity are fairly similar in their early stages and diverge over time due to the differences in slopes. Thus, the spacing or timing difference $W_2$, between valid pulses A and B when crossing a lower threshold $T_2$ (points 78 and 80 respectively), is substantially less than the spacing $W_1$ when the same pulses cross the higher threshold $T_1$.

It is apparent that the lower threshold level $T_2$ could not be utilized alone to determine the validity of pulses since this would result in the acceptance of spurious signals. For example, pulse C, representing a spurious pulse, crosses threshold level $T_2$, at point 82. Thus, if threshold level $T_2$ alone were used to test validly, pulse C would be improperly accepted as valid. Therefore, the determination of validity of the pulse must be based on a comparison at a higher threshold level represented by $T_1$. Accordingly, in the subject circuitry, only pulses which exceed the upper threshold level $T_1$ are accepted as valid pulses, while the lower threshold level $T_2$ is utilized as a timing mechanism for reducing the effects of jitter.

Referring to FIGS. 4 and 5, the circuits of the subject invention and its operation will be more fully described. As illustrated in the block diagram of FIG. 5, the output of photodetector 30 is supplied to two amplification stages 70 and 72 respectively. Preferably, the preamplifier 70 has a differential output while amplifier 72 has both a differential input and output. The two amplification stages are intended to provide a gain of between 200 and 400. By this arrangement the voltage generated by the photodetector 30 can be boosted to approximately one-half volt or more.

The output of amplifier 72 is supplied to a first comparator means 74 which determines if the pulse is a valid signal. Comparator 74 is configured to output a first signal when the input voltage exceeds the upper threshold level $T_1$. Referring to FIG. 4A, the type of output of the first comparator means 74 is shown, when supplied with the input pulses illustrated in FIG. 3. Thus, for pulse A, a first signal $A_1$, will be generated beginning when pulse A crosses the upper threshold $T_1$ at the point 60. Similarly, a signal $B_1$ is generated when pulse B crosses upper threshold $T_2$ at point 62. The signals $A_1$ and $B_1$ will remain high for as long as the amplitude of the associated input pulses exceed threshold level $T_1$. As discussed above, the time difference $W_1$ between the initiation of signals $A_1$ and $B_1$ corresponds to the jitter effects of the prior art.

In order to reduce this jitter, the subject invention includes a second comparator means 76 which tests the incoming pulses against a substantially lower threshold level $T_2$. Comparator 76 is configured to initiate a second signal when the incoming pulse exceeds the lower threshold level $T_2$. FIG. 4B illustrates the output of second comparitor 76 when supplied with the pulses illustrated in FIG. 3. More particularly, second signal $A_2$, is generated when pulse A crosses the lower threshold $T_2$ at point 78. Similarly, signal $B_2$, is generated when pulse B crosses threshold $T_2$ at point 80. As seen in FIGS. 2 and 3, pulse B crosses threshold level $T_2$ at a fixed time $W_2$ later than pulse A. As discussed above, fixed time interval $W_2$ associated with threshold level $T_2$, is substantially less than the interval $W_1$ associated with upper threshold level $T_1$. This reduction enables the circuit to substantially reduce jitter.

Because comparator 76 is set at a low threshold level, it will generate signals based on pulses which are not valid. For example, since pulse C crosses lower threshold level $T_2$ at point 82, a signal $C_2$, will be generated as seen in FIG. 4B. Since comparator 76 produces signals based on invalid pulses, the information derived therefrom cannot be used solely to determine the validity of pulses. Rather, the signals generated by comparator 76 are combined with those produced by comparator 74 to achieve the desired results.

In accordance with the subject invention, the signals of the second comparator means 76 are supplied to a delay means 84. Delay means 84 may be defined, for example, by a monostable multivibrator. The length of the delay is calculated based on various factors such as the particular threshold levels which have been selected. However, the time period must be sufficiently long enough such that the output of delay means 84 occurs during the time when the pulses have exceeded the upper threshold level $T_1$. FIG. 4C illustrates the output of the delay means when supplied with the signals generated by comparator 76 shown in FIG. 4B. The output ($A_3$, $B_3$ and $C_3$) of delay means 84 is identical in character to the output of comparator 76 except for a uniform delay.

The output from delay means 84 and the output from the first comparator means 74 are then supplied to a gate means 90. Preferably, gate means 90 consists of a logical circuit such as an "and" gate. As well known in the art, an "and" gate will generate a positive going output pulse only when both incoming signals are high. It is to be understood of course, that if it is desired that a low signal be indicative of a valid pulse, a logical "nand" gate could be used wherein a negative going pulse is produced only if both inputs are high.

The output of gate 90 having "and" logic is illustrated in FIG. 4D. More particularly, an output pulse $A_4$, based on input pulse A, will be generated when the signals $A_1$ and $A_3$ from comparator 74 and delay means 84 are simultaneously high. Similarly, an output pulse $B_4$ will be generated when signals $B_1$ and $B_3$ are both high. The spacing between the output pulses $A_4$ and $B_4$ corresponds to the timing interval $W_2$. Gate means 90 will not generate any output pulse for input pulse C since the gate is never supplied with a corresponding signal from comparator 74.

Each output pulse $A_4$, $B_4$ is utilized as an interrupt signal causing the computer to read a counter having an address corresponding to the position of the cathode ray. Because the time difference $W_2$, between pulses $A_4$ and $B_4$, is relatively short, the measurement variations which cause jitter are minimized. Of course, since there has been a delay incorporated in the circuitry, the interrupt signal will occur at a finite time after the origin of each pulse. However since the delay is a fixed value, the timing of the interrupt signal can be logically corrected by subtracting a fixed amount from the counter.

As illustrated in FIGS. 3 and 4, the timing difference $W_2$, between the outputs $A_4$ and $B_4$, is substantially less than the difference $W_1$ between the upper threshold crossings 60 and 62. In practice, the time period $W_2$ is even shorter than illustrated. More particularly, amplifiers, such as those used to boost the incoming pulses, have inherent limitations (referred to as slope limits) which tend to inhibit fast rising pulses. Accordingly, in the early stages of the pulses, the paths of the curves will be virtually coincident thereby substantially eliminating the effects of jitter.

The amount of reduction of jitter can be affected by adjusting the threshold levels $T_1$ and $T_2$. For example, when the upper thresholds level $T_1$ is set at 75% of maximum amplitude and the lower threshold $T_2$ at 50% of maximum, a jitter of 40 nanoseconds can be achieved. When the lower threshold level is reduced to 25% of maximum amplitude, a jitter of only 20 nanoseconds can be achieved. Reduction of jitter to this range corresponds to an error of approximately ±0.5 pixels. By this arrangement, the accurate location of individual pixels can be achieved to permit the use of a light pen in far more demanding applications such as drawing.

The subject invention includes new and improved discrimination circuit for determining the validity of incoming pulses while eliminating the effects of jitter. The subject circuit includes a first comparator means 74 which receives the input pulses and generates a first signal whenever the voltage exceeds an upper threshold level $T_1$, corresponding to a valid pulse. A second comparator means 76 is provided for generating a second signal when the voltage of the input pulse exceeds a lower threshold level $T_2$. The second signal of the second comparator is delayed and supplied to a gate means 90 along with the first signal. The gate means generates an output pulse whenever it receives the first and second signals simultaneously. The production of the output signal by the gate means is substantially independent of the amplitude of the incoming pulses.

While the subject invention has been described with reference to preferred embodiments, it is apparent that changes and modifications could be made therein by one skilled in the art without varying from the scope and spirit of the subject invention as defined by the appended claims. Further, it is envisioned that the high resolution light pen and discrimination circuitry may be used independently when desired. However, when used in combination, maximum resolution and the elimination of the detrimental effects of jitter are achieved.

What is claimed is:

1. A discrimination circuit for determining whether input pulses from a photodetector are valid signals and for generating an output signal at a substantially predetermined time after the rise of a valid signal, said input pulses each having a rising edge, said circuit comprising:
   first comparator means for receiving said input pulses and for generating a first signal at substantially a first threshold crossing time whenever the instantaneous magnitude of an input pulse at its rising edge exceeds a first threshold level, wherein the generation of a first signal by the first comparator indicates that the input pulse is valid;
   second comparator means for receiving said input pulses and for generating a second signal when the instantaneous magnitude of an input pulse at its rising edge exceeds a second selected threshold level at substantially a second threshold crossing time, said second selected threshold level being lower than said first threshold level, so that the second threshold crossing times of any two valid pulses differ by an amount less than the difference between the first threshold crossing times of the two valid pulses;

delay means connected to said second comparator means for delaying said second signal by a fixed time delay; and gate means operatively connected to said first comparator means and said delay means, said time delay being such that when the first comparator generates a first signal, the gate means receives the delayed second signal after the first threshold crossing time, said gate means generating an output pulse upon receiving the first signal and the delayed second signal, said output pulse being generated at substantially the arrival time of the delayed second signal, said second threshold level being selected such that the time of generation of the output signal is substantially the same for all valid signals and substantially independent of the slope of said valid signals.

2. A discrimination circuit as recited in claim 1 wherein said fixed delay is such that, for all valid signals, when the first comparator generates a first signal at the first threshold crossing time, the gate means receives the delayed second signal substantially at or after the first threshold crossing time, and wherein said gate means comprises a logical "and" circuit such that a positive output pulse is produced only when positive signals are substantially simultaneously received from said first comparator means and said delay means.

3. A discrimination circuit as recited in claim 1 further including an amplification means connected to both said comparator means, said amplification means for amplifying said input pulses prior to being supplied to both the comparator means.

4. A discrimination circuit as recited in claim 2 further including an amplification means connected to both said comparator means, said amplification means for amplifying said input pulses prior to being supplied to both the comparator means.

5. The circuit of claim 1, wherein said ratio of the first to the second threshold levels is 75:50.

6. The circuit of claim 5, wherein the first level is about 75% of the maximum amplitude.

7. The circuit of claim 1, wherein said ratio of the first to the second threshold levels is 75:25.

8. The circuit of claim 7, wherein the first level is about 75% of the maximum amplitude.

9. A method of determining whether an input pulse is a valid signal and generating an output pulse at a substantially predetermined time after the rise of a valid signal, said input pulse having a rising edge, said method comprising:

comparing the instantaneous magnitude of the input pulse at its rising edge with first and second selected threshold levels, said first threshold level being greater than said second threshold level;

generating a first signal at a first threshold crossing time whenever the instantaneous magnitude of the input pulse exceeds the first threshold level;

generating a second signal at a second threshold crossing time whenever the instantaneous magnitude of the input pulse at its rising edge exceeds the second threshold level, so that the difference between the second threshold crossing times of any two valid input pulses is less than that between the first threshold crossing times of the two pulses;

supplying the first signal directly to a gate means and supplying the second signal to said gate means only after a fixed period of time; said fixed period being such that the delayed second signal is supplied to the gate means after the first signal is supplied; and generating an output pulse upon receiving the first and second signals at said gate means, said output pulse being generated at substantially the arrival time of the delayed second signal, said second threshold level being selected such that the time of generation of the output signal is substantially the same for all valid signals and substantially independent of the slope of said valid signals.

* * * * *